United States Patent [19]
Johnson

[11] Patent Number: 4,481,389
[45] Date of Patent: Nov. 6, 1984

[54] MAGNETIC CONTROL DEVICE

[75] Inventor: J. Wallace Johnson, New Caney, Tex.

[73] Assignee: Liquid Level Lectronics, Inc., Porter, Tex.

[21] Appl. No.: 404,615

[22] Filed: Aug. 2, 1982

[51] Int. Cl.³ .................... H01H 35/18; H01H 9/00; F16K 31/00; G01F 23/10
[52] U.S. Cl. ................................ 200/84 C; 73/308; 200/61.86; 335/205; 335/207; 335/219; 335/229; 251/65
[58] Field of Search ............... 335/205, 207, 215, 219, 335/229, 223, 280, 302, 306; 338/33; 310/103; 200/84 C, 84 R, 61.86; 73/308, 313, 316, 319; 251/65; 137/43, 409, 410

[56] References Cited
U.S. PATENT DOCUMENTS

| 2,869,563 | 1/1959 | Schoengrun | 335/223 X |
| 3,206,160 | 9/1965 | Bennett | 335/229 X |
| 3,209,297 | 9/1965 | Kmiecik et al. | 338/33 |
| 3,261,942 | 7/1966 | Wessel | 335/280 X |
| 3,609,425 | 9/1971 | Sheridan | 310/103 |
| 3,781,498 | 12/1973 | Kamil et al. | 200/84 C |
| 3,822,933 | 7/1974 | Johnson | 251/65 |
| 4,091,250 | 5/1978 | Siiberg | 200/84 C |
| 4,203,571 | 5/1980 | Ruchser | 251/65 |

Primary Examiner—J. R. Scott
Attorney, Agent, or Firm—Robert W. B. Dickerson

[57] ABSTRACT

A magnetic control device having a movable, permanent magnet or fixed-polar portion, a movable element of magnetizable material, i.e., material of high permeability and a plurality of fixed members also of magnetizable material.

11 Claims, 11 Drawing Figures

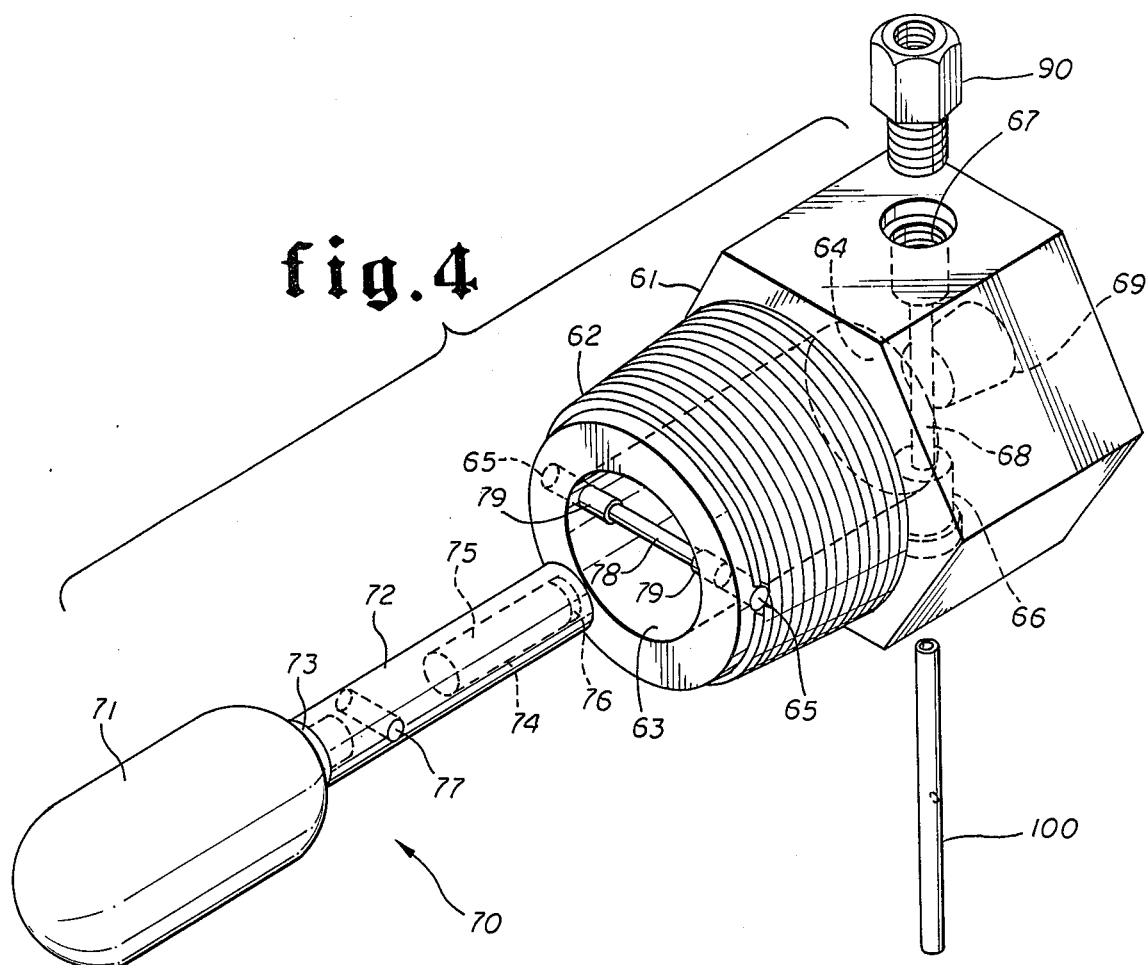
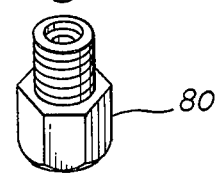
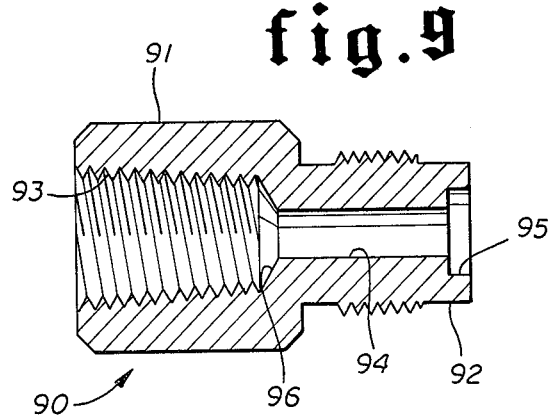
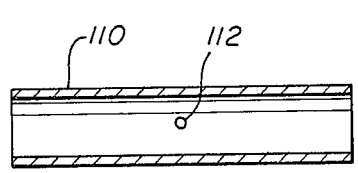
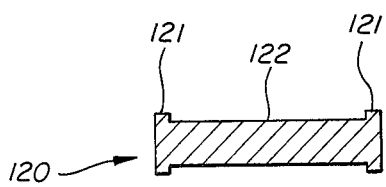

MAGNETIC CONTROL DEVICE

BACKGROUND OF THE INVENTION

Control elements have long been used to operate a plethora of industrial devices. Among such controlled devices are valves and switches. Such control elements may be mechanically, magnetically, electrically, hydraulically or penumatically actuated. Magnetically actuated elements offer a number of advantages. One such device is exemplified by U.S. Pat. No. 3,822,933. A search ordered produced the following most pertinent U.S. patents, namely U.S. Pat. Nos.: 2,869,563; 3,609,425; 3,535,664; 3,261,942; 3,261,944; 3,729,697; 4,039,985; 2,548,581; 3,206,160, 2,969,445; and 3,732,512. One consistant goal has been to minimize necessary power input and at the same time and to reduce quantitative size without reducing effective control. Such magnetic controls have used both permanent magnets as well as those having solenoid induced poles. The control of this invention has made substantial, innovative steps toward accomplishing the aforementioned goals by utilizing both the forces of polar attraction and repulsion.

SUMMARY OF THE INVENTION

A permanent magnet, which may include one whose poles are solenoid controlled, is movably positioned relative to a housing. Such housing includes a pair of spaced elements constructed of magnetic material (sometimes hereinafter called magnetizable material). Magnetizable, as used herein means having high permeability, capable of being magnetized or having poles developed by an outside influence and returning to its non-magnetized or non-polar condition on removal of said outside influence. Movable within said housing is a further member, sometimes deemed a valve body, that also would be constructed of such magnetizable material. As said permanent magnet is moved, its nearest pole the nearest end of generates opposite poles in both of said spaced elements as well as in the nearest end of said further member, while the other end of said further member has a pole generated like that "Nearest pole" of said permanent magnet. This results in a trip action of the valve body, which results from both the forces of attraction and repulsion from the poles of said spaced elements. Such movement may then control a number of different controls, such as the flow of fluid through a valve, or the activation of a switch.

DESCRIPTION OF THE DRAWINGS

FIG. 4 is an exploded perspective of a float and housing, applying the invention to a level control;

FIG. 9 is a vertical section through the connector; and

FIGS. 10 and 11 are vertical sections through, respectively, the magnetic switch housing tube and the spool.

DESCRIPTION OF PREFERRED EMBODIMENTS

Figure 1:
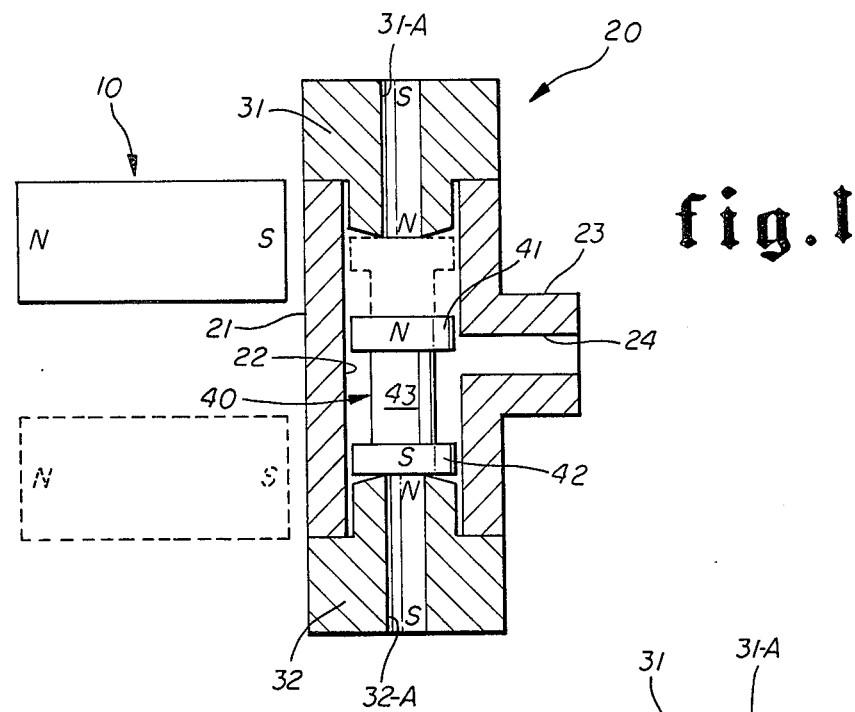
FIG. 1 is a diagrammetic representation of the invention as used for valve control.
Figure 2:
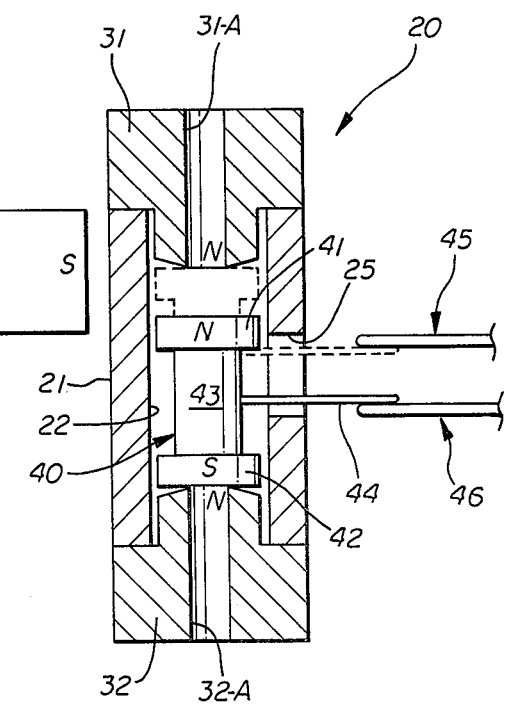
FIG. 2 is a similar diagrammatic representation for use as a switch control.
Figure 3:
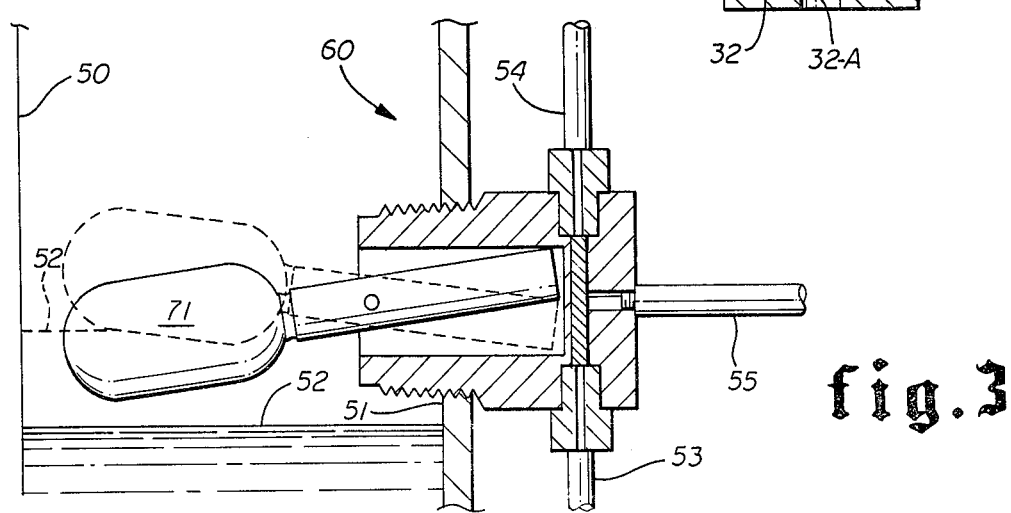
FIG. 3 is a somewhat schematic vertical section through a vessel having a level control therein, using the principal of this invention.
Figure 5:
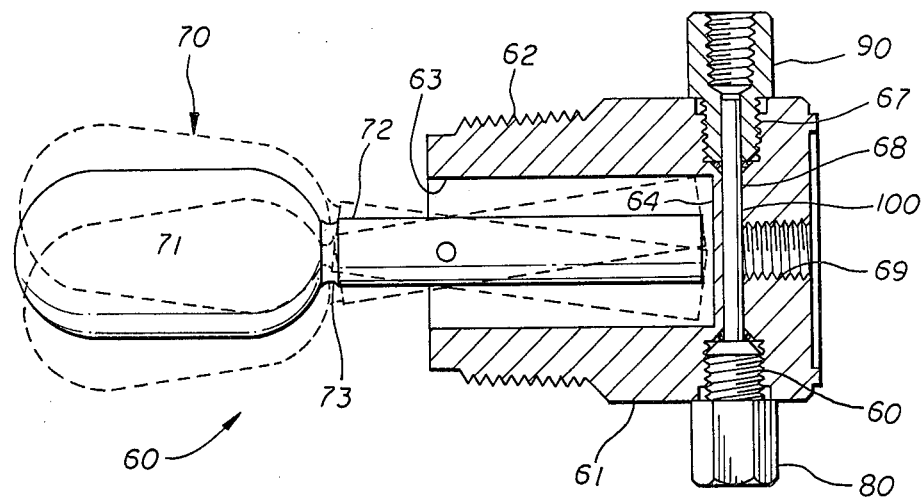
FIG. 5 is a vertical section through the housing of FIG. 4.
Figure 6:
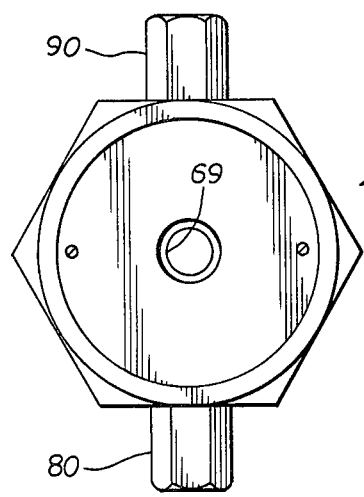
FIG. 6 is a right-side elevation taken at a right angle to FIG. 5.
Figure 7:
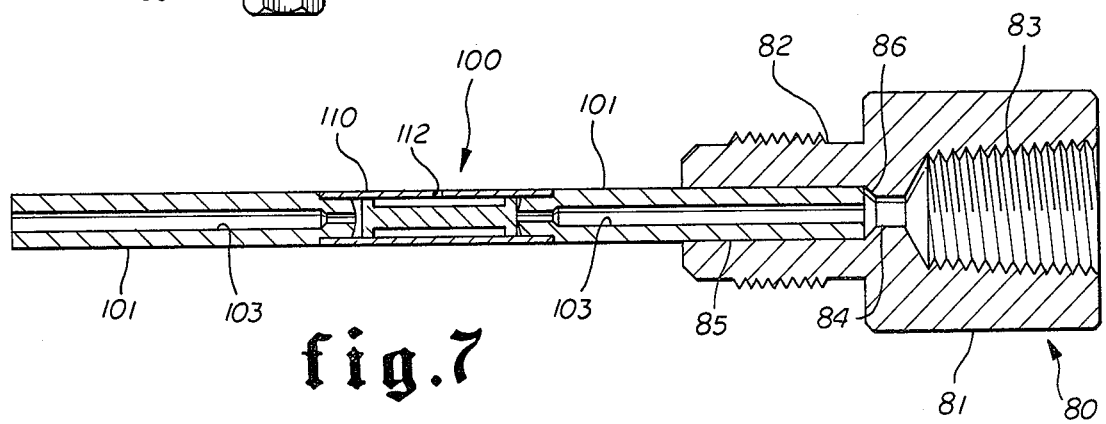
FIG. 7 is a vertical section through the vent port adapter and the attached switch cartridge assembly.

The diagrametric representations of FIGS. 1 and 2, use like numerals for like parts, and illustrate the general nature and application of the invention.

Member 10 indicates a movable magnet having fixed poles, as indicated N (North) and S (South). Such a member may be a permanent magnet or a core of permeable material controlled by a solenoid winding. Each of said figures depicts a generalized housing 20. Such housing include a central cylindrical portion 21 fabricated of non-magnetic material, and having an internal bore 22 therethrough. The valve control of FIG. 1 includes a depending lug 23, which has a central fluid passageway 24 in communication with bore 22. On the other hand, the switch control of FIG. 2, includes an extended aperture 25 through its cylindrical portion 21. In both figures, end pieces or fittings 31, 32 form the opposite ends of housing 20. Although the switch control of FIG. 2 may have no specific need therefor, such fittings 31, 32 are shown to have axial passageways 31-A, 32-A therethrough, in communication with central housing bore 22. Each such fitting 31, 32 would be fabricated of a magnetizable material, ie., of high permeability, such as of nickel-iron alloy.

Movable within central housing bore is valve member or spool 40, having ends 41, 42 connected by web 43. This spool would also be fabricated of high-permeability, ie., magnetizable material. The web portion 43 of FIG. 2, may carry a switch-activating lever 44 which may extend through and move within the axial confines of aperture 25. Such lever may, by contact, close either of the electrical circuits 45 or 46.

In operation, this invention utilizes the well known effects of the repelling or attracting by like or dissimilar magnetic poles, respectively. Magnet 10 would have fixed or defined poles. As illustrated, the south pole of member 10 is nearest housing 20. This would cause the nearest portions of members 31, 32 and 40 to possess a N (North) pole, as indicated. The result of this alignment is that "N", of member 31, repels "N" of member 40, while "N" of member 32 attracts "S" of member 40. This results in a quick, or snap-action, movement of member 40 from the phantom line position to the solid line one. If fixed pole magnet 10 is moved to its phantom line position, then the polar arrangements of members 31 and 32 remain the same, while the polarity of spool 40 reverses. This results in "N" of member 32 repelling the then adjacent "N" of spool 40, while "N" of member 31 attracts the then adjacent "S" of spool 40. The magnetic forces of repulsion or attraction are a function of the spacing or gap between interacting bodies. Even so it has been interestingly observed that a quick, smooth movement occurs, in as much as the repelling action of the like, adjacent poles decreases as the attracting force of the unlike, adjacent poles increases.

Consider now the embodiment of FIGS. 3-11 which depict the invention, and hardware, as may be used for a level control. Vessel wall 50 may have a threaded wall aperture 51, and receive liquid 52 from an outside source, not shown. Threadedly received by threaded aperture 51 would be the level control, generally illustrated at 60. Connected thereto may be a fluid (hydraulic or pneumatic) input or supply conduit 53 (from a source not shown), supply fluid exhaust conduit 54 and supply fluid output conduit 55. The latter mentioned conduit would lead to a controlled device, such as a pump adapted to control the supply of liquid 52 to vessel 50. The inlet and outlet ports (later more fully described) could be functionally rearranged, by changing their conduits, depending or whether direct acting (increased output on increase in liquid level) on indirect acting (decreased output or increase in liquid level) action is desired.

Level control 60 includes housing 61 having a threaded lug extension 62 for engagement with vessel aperture 51. This lug extension includes a hollow bore 63, which bottoms at 64. Said lug also includes aligned, pivot pin receiving apertures 65 through its walls. Housing 61 includes oppositely positioned, threaded bores 66, 67, said bores each communicating with lateral counterbore 68. Said housing 61 also includes axial, threaded bore 69, which also communicates with housing counterbore 68.

A float assembly is generally illustrated by numeral 70, and includes a float body 71 which threadedly receives a threaded lug extension 73 of float arm or lever 72. Said arm or lever 72 carries a permanent magnet 75 positioned or imbedded in a tapped bore 74, at one end of arm 72, said bore being closed by plug 76. Said lever also includes a lateral passageway 77 to permit pivotal placement on pivot pin 78, said pin extending through apertures 65 in housing lug 62. Spacer sleeves 79 would be positioned on pin 78, on either side of float assembly lever 72, with lever magnet 75 rockably positioned in lug bore 63 adjacent said bore's bottom 64.

A magnetic switch assembly includes adapter 80, connector 90 and magnetic cartridge 100. Said adapter (FIG. 7) includes nut housing 81 with depending exteriorly threaded, lug extension 82. Axially oriented, threaded bore 83 communicates with reduced-diameter counter bore 84, and it, in turn, with slightly enlarged counter bore 85, the latter connection being by virtue of chamferred walls 86. Connector 90 (FIG. 9) much like adapter 80, includes nut housing 91, with depending, exteriorly threaded, lug extension 92. It too includes axially oriented, threaded bore 93 communicating with reduced-diameter counterbore 94 by virtue of chamferred walls 96. An enlarged counterbore 95 extends from one end of counterbore 94 to the end of the member.

Figure 8:
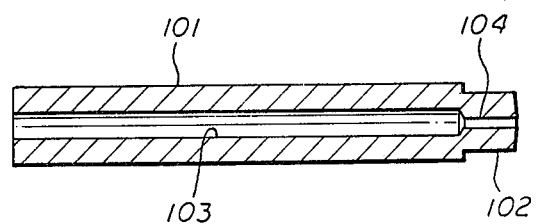
FIG. 8 is a vertical section through one of the end pieces of the switch cartridge assembly.

Magnetic cartridge 100 includes similar but oppositely disposed end pieces 101 (FIG. 8). Each end piece includes a reduced diameter, lug extension 102. Each of said lug extensions 102 is snugly received within respective opposite ends of hollow, cylindrical, magnetic switch housing tube 110 (FIG. 10). Each end piece 101 also includes axial bore 103 in communicating relationship with counterbore 104 which extends through lug extension 102. Movable within the hollow interior of tube 110 is spool, or shuttle, 120 which has annular flanges 121 at each end connected by shaft 122 (FIG. 11). Said tube 110 also includes aperture 112 through one wall thereof.

Adapter 80 is threadedly engaged with threaded bore 66, after having one end of an end piece 101 snugly fitted within adapter counterbore 85, with the entire magnetic cartridge 100 extending through housing counter bore 68. The opposite end of the opposite end piece 101 is then received within counter bore 94 of connector 90, when said connector's threaded lug extension is engaged with housing bore 67.

It should be noted that spool 120 as well as end pieces 101 are fabricated of the aforementioned permeable, ie., magnetizable material. The remaining housing and float assembly components, other than magnet 75, should be non magnetic.

OPERATION

As shown and described, this level control is a 3-way, two position valve. Obviously, other valve arrangements could be utilized. Herein, adapter 80 functions as supply inlet, bore or port 69 functions as supply fluid outlet, and connector 90 as an exhaust. Float 71 would ride atop the surface 52 of fluid within vessel 50. During normal operation, when said fluid level 52 is sufficiently high, ie., the high phantom line position of FIG. 5, the permanent magnet 75 contained by lever arm 72 would be at its low phantom line position. This would result in magnetic spool 120 being urged upwardly by the magnetic force of the lower end piece 101 repelling the spool while the upper end piece 101 attracts the spool. The upper flange 121 of said spool would block supply fluid passage through said upper end piece bore to exhaust. Supply fluid would course through the lower end piece bore into the hollow interior of tube 110, around the lower flange of spool 120, out tube aperture 112, through housing outlet port 69 to the controlled mechanism, such as a pump. As the fluid level may drop, float 71 would also drop, pivotally causing the magnet-containing end of lever arm 72 to rise. This would reverse the polarity of end pieces 101, causing said spool to rapidly move downwardly, blocking supply from entering tube 110 from the lower end piece bore. Supply fluid from the controlled mechanism and its conduit system would reenter supply fluid outlet port 69, enter tube 110 through its aperture 112, pass upwardly through the upper end piece bore and out exhaust port 93 of connector 90. It should be noted that the passageways 104, through end pieces 101, leading to spool 120, are of very small diameter. Thus the magnetic force exerted would be sufficient to hold the spool in a blocking position against the force exerted by the supply fluid.

Although limited embodiments have been described, it should be obvious that numerous modifications would be possible by one skilled in the art without departing from the spirit of the invention, the scope of which is limited only by the following claims.

I claim:

1. A magnetic control device, comprising:
housing means carrying a movable shuttle, said shuttle being comprised of magnetizable material capable of having reversible poles formed as a function of a separate fixed pole magnet, said shuttle being movable between a first and second position; first and second members, also comprised of magnetizable material capable of having reversible poles formed as a function of a separate fixed pole magnet, said first and second members being spacedly positioned at approximately said first and second positions; and
fixed pole magnet means movable adjacent said movable shuttle wherein on one pole of said fixed pole magnet means being adjacent either one of said positions, said shuttle is magnetically urged toward the other of said positions.

2. The control device of claim 1, wherein said first and second members comprise end pieces of said housing means.

3. The control device of claim 1 wherein said first and second members further comprise, respectively, first and second ports in said housing, said shuttle including means for blocking fluid passage through either of said ports when in contact therewith.

4. The control device of claim 3, wherein:
said housing includes a third port, and said shuttle includes means for selectively controlling communication between said third port and each of said first and second ports.

5. The control device of claim 1 wherein said first and second members comprise stops limiting the movement of said shuttle.

6. A fixed pole magnet means movably positioned relative to a movable shuttle;
housing means carrying said movable shuttle, said shuttle being comprised of magnetizable material capable of having reversible poles formed as a function of the location of said fixed pole magnet means, said shuttle being movable between a first and second position;
first and second members, also comprised of magnetizable material, spacedly positioned at approximately the respective said first and second positions;
float means positioned relative to said fixed pole magnet means adapted to movably float on the surface of a quantity of liquid; and
means for causing movement of said shuttle as a function of the level of said liquid, said movement causing means including said fixed pole magnet means, said movable shuttle, and said first and second members.

7. The level control device of claim 6, wherein:
said float means and said fixed pole magnet are positioned at approximately the opposite ends of a lever, said lever being pivotally associated with said housing.

8. The level control device of claim 6, and including:
switch assembly, said switch assembly comprising said first and second members, said shuttle, and a shuttle container, said shuttle container being positioned intermediate said first and second members.

9. The level control device of claim 8, and including:
said float means and said fixed magnet are positioned at approximately the opposite ends of a lever, said lever being pivotally associated with said housing;
said first and second members each includes passageways therethrough in blockable, communicating relationship with the said shuttle container, each said first and second members' said passageway also being in communication with one of a supply fluid inlet and a further fluid port; and
additional fluid port in said housing communicating with the interior of said shuttle container.

10. A magnetic switch control device, comprising:
a movably positioned magnet having defined poles, and positioned adjacent a housing;
said housing carrying a movable shuttle, said shuttle being comprised of magnetic material, and movable between a first and second position;
first and second members, also comprised of magnetic material, spacedly, positioned at approximately the respective said first and second positions;
switch means; and
means for controlling the opening and closing of said switch means as a function of the position of said defined pole magnet.

11. The control device of claim 10, wherein said switch means includes spaced contacts and said shuttle carries means for engagement with said contacts.

* * * * *